June 27, 1944.   J. A. GRABEC   2,352,194
METHOD OF MOLDING PERFORATED ELASTIC MATERIAL
Filed Sept. 13, 1937   7 Sheets-Sheet 3

Inventor:
Josef A. Grabec
By Dike, Calver & Gray
Attorneys

June 27, 1944. J. A. GRABEC 2,352,194
METHOD OF MOLDING PERFORATED ELASTIC MATERIAL
Filed Sept. 13, 1937 7 Sheets-Sheet 4

Inventor:
Josef A. Grabec
By Dike, Calver & Gray
Attorneys

Inventor:
Josef A. Grabec
By Dike, Calver & Gray
Attorneys.

June 27, 1944.    J. A. GRABEC    2,352,194
METHOD OF MOLDING PERFORATED ELASTIC MATERIAL
Filed Sept. 13, 1937    7 Sheets-Sheet 6

Inventor.
Josef A. Grabec
By Dike, Calver & Gray
Attorneys.

Patented June 27, 1944

2,352,194

UNITED STATES PATENT OFFICE 2,352,194

METHOD OF MOLDING PERFORATED ELASTIC MATERIAL

Josef A. Grabec, Bratislava, Czechoslovakia; vested in the Alien Property Custodian Application September 13, 1937, Serial No. 163,602

2 Claims. (Cl. 154—2)

This invention relates to a novel method and apparatus for producing foraminous, elastic sheet material.

More particularly, the present invention is a continuation in part of my copending applications, Serial No. 709,607, filed February 3, 1934, and Serial No. 24,943, filed June 4, 1935, both of which relate to materials that are manufactured according to the present invention.

Rubber, or rubberized materials are used for all manner of garments, but inasmuch as my new materials, although well suited for general uses, are particularly adapted to corsets and girdles, I shall, for the sake of brevity, refer to such garments as corseting materials.

Previously, rubber corseting materials have been made by punching apertures either in a sheet of rubber or in a sheet of combined fabric and rubber. The products have not been satisfactory for punched sheet rubber tears easily and the relatively few holes in the sheet have been wholly insufficient to permit transpiration from the body. Consequently, rubber corseting materials have been hot, uncomfortable and frequently irritate the skin.

In contradistinction to these perforated or punctured materials, my improved material possesses an open, regular gauze-like structure. It is light, strong and open textured, permits free transpiration and is well suited for use in bathing suits or corsets.

It is the primary aim and object of the present invention to devise a method and apparatus for obtaining a composite sheet material, composed of an elastic material, such as rubber, and of a backing material, such as distensible textile fabric, which requires no adhesive, which is of light weight, well ventilated, and permits transpiration, and which has good distensibility in any direction.

It is a more particular object of the present invention to devise a method and apparatus for molding sheets of an elastic material, such as rubber, and distensible textile fabric, into a composite material in which the two materials are intimately united and in which substantially all of the elastic material has been molded into a new form which not only gives a maximum distensibility to the composite material with the least amount of elastic material, but also provides for effective ventilation and complete transpiration wherever worn.

It is another particular object of the present invention to devise a method and apparatus for molding the elastic stock material of the composite material into such a form that the composite material is particularly suited for holding stitches when sewn.

It is another object of the present invention to devise a method and apparatus for molding elastic sheet material, such as rubber, into a new form in which it is given excellent distensibility, is well ventilated, and is very light in weight.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In accordance with the present invention, a layer or ply of uncured rubber stock, which may be superposed upon a layer of distensible textile fabric, is molded into a perforated pattern by two cooperating pressure-mold members, one of which includes a multiplicity of perforating elements and the other of which provides a surface of slightly yieldable material in the indentations of which the tips of said perforating elements become seated. In order to mold the uncured rubber ply into a perforated pattern, and also firmly unite the same with a layer of textile fabric if so desired, the rubber ply is heated until it reaches a moldable or pliable stage. The heated rubber ply is then molded under pressure between the bite or in the cavity of said mold members. If the rubber sheet is to have a backing material of textile fabric, the same is superposed on said rubber sheet whereby some rubber will also be molded into meshes of the textile fabric and establish a firm bond between the two materials. The cooperating pressure-mold members may take the form of either cooperating dies or of two profiled rolls. The material obtained by the pressure mold in either form has a geometrical system of narrowly spaced rubber ribs with intervening spaces or perforations which may have a fabric backing, if desired. The perforating elements of the mold members which are of pyramidal or modified pyramidal shape do no damage to the threads of the fabric backing but merely spread them apart or momentarily force them into the slightly resilient indentations in the surface of one of the mold members. The molded material is then vulcanized so that it will thereafter permanently retain its form.

Figures 1, 2, 3:
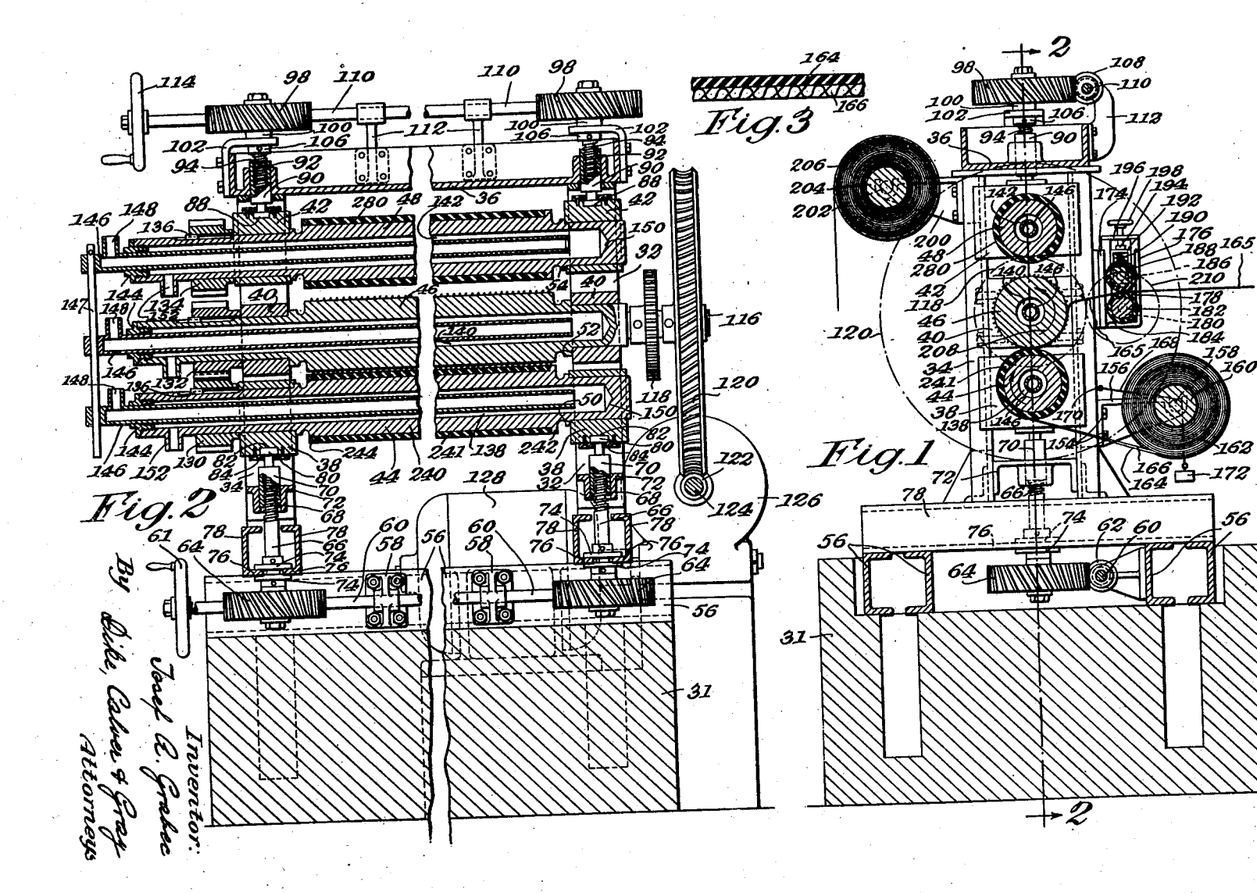
Fig. 1 is a cross-section through a machine in which materials may be produced according to the present method.
Fig. 2 is a longitudinal section of the machine, taken substantially along the line 2—2 of Fig. 1.
Fig. 3 is an enlarged, fragmentary section of the two supply materials which are to be molded into a composite material in the present machine.

A preferred embodiment of my machine, adapted for continuous production is illustrated in Figs. 1 and 2.

General construction of machine

The machine is mounted on any suitable base 31 and comprises a main frame which may consist of a number of suitably joined structural steel shapes. More particularly, suitably supported, spaced uprights 32 and 34, joined at the top by a removable tie bar 36, provide two opposite, vertical guides for three pairs of bearing blocks 38, 40 and 42 which rotatably support rolls 44, 46 and 48 respectively. These rolls 44, 46 and 48 are provided with annular shoulders 50, 52 and 54, respectively, which engage the adjacent bearing blocks 38, 40 and 42 respectively, to prevent the axial movement of said rolls.

Mounted in any suitable manner on one of the channel irons 56 of the supporting frame of the machine are several spaced bearing brackets 58 which rotatably support a shaft 60, provided with two spaced worms 62. The worms 62 are in permanent mesh with worm gears 64, mounted on spaced vertical spindles 66 which are threaded at 68 and cooperate with internally threaded sleeves 70, guided for vertical movement in cross bars 72 which are secured in any suitable manner to the uprights 32, 34. Also mounted on the spindles 66 are spaced collars 74 which straddle the opposite flanges 76 of several channel irons 78 of the supporting frame of the machine. Consequently, rotation of the worm gears 64 results in rotation of the spindles 66 but not in any axial movement thereof. The sleeves 70 are provided with heads 80 which are received in recesses 82 of the bearing blocks 38 and retained therein by ring members 84. The heads 80 of the sleeves 70 are preferably square or of other suitable shape so that said sleeves will not turn when the spindles 66 are rotated. One end of the worm-carrying shaft 60 is provided with a wheel 61 wherewith to manipulate the lowermost or "counter" roll 44 toward and away from the middle roll 46, as can be readily understood.

The middle or "pin" roll 46 has a fixed disposition inasmuch as its bearing blocks 40 are bolted or otherwise secured to the uprights 32, 34.

The uppermost roll 48 is supported in a manner similar to the counterroll 44 and is covered at 280 with a relatively soft and yieldable material such as soft rubber. More particularly, the bearing blocks 42 receive the preferably square heads 88 of two sleeves 90 which are internally threaded at 92 to receive threaded spindles 94 on which are mounted worm gears 98, bearing with their hubs 100 against brackets 102, bolted or otherwise secured to the tie bar 36. The sleeves 90 are guided for vertical movement in the tie bar 36. Also mounted on the spindles 94 are collars 106 which are in engagement with the brackets 102 and, together with the hubs 100 of the worm gears 98, prevent axial movement of said spindles 94. Permanently meshing with the worm gears 98 are worms 108 which are provided on a shaft 110, journalled in spaced bearing brackets 112 which are mounted on the tie bar 36. Mounted on one end of the shaft 110 is a wheel 114 for manipulating the uppermost roll 48 toward and away from the pin roll 46.

The middle roll 46 is provided with an extension 116 which has mounted thereon a comparatively small spur gear 118 and a large worm gear 120, the latter being in permanent mesh with a worm 122 on the slow shaft 124 of any conventional reduction gearing 126, the fast shaft of said reduction gearing is coupled in any convenient manner to the shaft of an electric motor 128, suitably mounted on the machine base 31. Any other drive may, of course, be used for the middle roll 46.

The rolls 44, 46 and 48 carry identical gears 130, 132 and 134, respectively, which are keyed or otherwise secured to said rolls at 136. These gears 130, 132 and 134 are preferably of the "herringbone" type to obviate any relative motion therebetween, and are adapted to drive the rolls 44 and 48 from the pin roll 46 whenever the former are in such proximity to the roll 46 that their gears 130, 134, come to mesh with the gear 132.

The rolls 44, 46 and 48 are centrally recessed at 138, 140 and 142, respectively, to form steam chambers which are closed at their open ends by stuffing boxes 144 through which extend steam delivery pipes 146, having inlets 148 which are in communication with manually operable valves (not shown) for the admission of steam to said pipes from any convenient source. A rod 147 extends through the rolls 44, 46 and 48 which counteracts any tendency of the steam pipes 146 to turn with the stuffing boxes 144 when the rolls 44, 46 and 48 rotate.

It will be observed in Fig. 2 that the steam pipes 146 extend nearly to the ends 150 of the steam chambers in the rolls 44, 46 and 48 so that steam discharged from the pipes flows throughout the greater length of the steam chambers in the rolls before escaping through the outlets 152 and from thence to a waste line (not shown). Of course, any medium other than steam may be used for heating the rolls 44, 46 and 48.

Bolted or otherwise secured at 154 to two of the uprights 32, 34 of the machine frame are spaced bearing brackets 156 which rotatably support at 158 a core 160, preferably in the manner shown in Fig. 1 to facilitate removal of said core. Wound on this core is a supply 162 of material, consisting of two superposed separate layers or plies 164 of rubber and 166 of distensible textile fabric. A string or cord 168, secured with one end at 170 to one of the uprights 32, 34 and carrying a comparatively light weight 172 at its other end, may be passed over the core 160 to exert a sufficiently large braking force on the supply roll 162 in order to prevent the same from freely rotating. Evidently, any other well known construction may be used in braking the supply roll 162.

The same uprights 32, 34 which carry the bearing brackets 156 are provided with guides 174 in which are mounted two spaced, vertically adjustable frames 176, providing vertical guides 178 for lower and upper bearing blocks 180 and 186, respectively. The lower bearing blocks 180, which normally rest by gravity on the bottom surfaces 184 of the guides 178, rotatably support a roll 182. The upper guide blocks 186 rotatably support another roll 188 which normally rests by gravity on the lower roll 182, but may be pressed against the latter by means of compression springs 190 which are interposed between the bearing blocks 186 and yokes 192, slidable in the guides 178 of the frames 176. The rolls 182, 188 are preferably covered with a resilient, yieldable material, such as soft rubber. Set screws 194, received by cross bars 196 of the frames 176, bear against the yokes 192 and are provided with handles 198 for changing the compression of the springs 190 at will.

The lower roll 182 carries a gear 210 which is in permanent mesh with the earlier described spur gear 118 on the pin roll 46. This roll is, therefore, rotated in clockwise direction as viewed in Fig. 1, whenever the pin roll is rotated in its normal direction, indicated by the arrow 208 in the same figure. The upper roll 188 is freely rotatable and rotates merely by virtue of its frictional engagement with the finished material as it leaves the machine. For reasons to be explained hereafter, the ratio between the gears 118 and 210 is such that the peripheral speed of the roll 182 is somewhat greater than that of the pin roll 46. The rolls 182 and 188 will hereafter be referred to as "pull-off" rolls.

Also mounted in any suitable manner on the uprights 32, 34 are two spaced bearing brackets 200 which rotatably support at 202 a core 204, preferably in a manner similar to that illustrated in Fig. 1 to facilitate the removal of said core. Wound on the core 204 is a supply of a somewhat distensible fabric 206 which may be used in the machine as will be hereafter explained. A similar braking device as the tensioned string 168 on the material supply roll 162 may be applied to the roll 206 to prevent free rotation of the same.

Figures 4, 5:
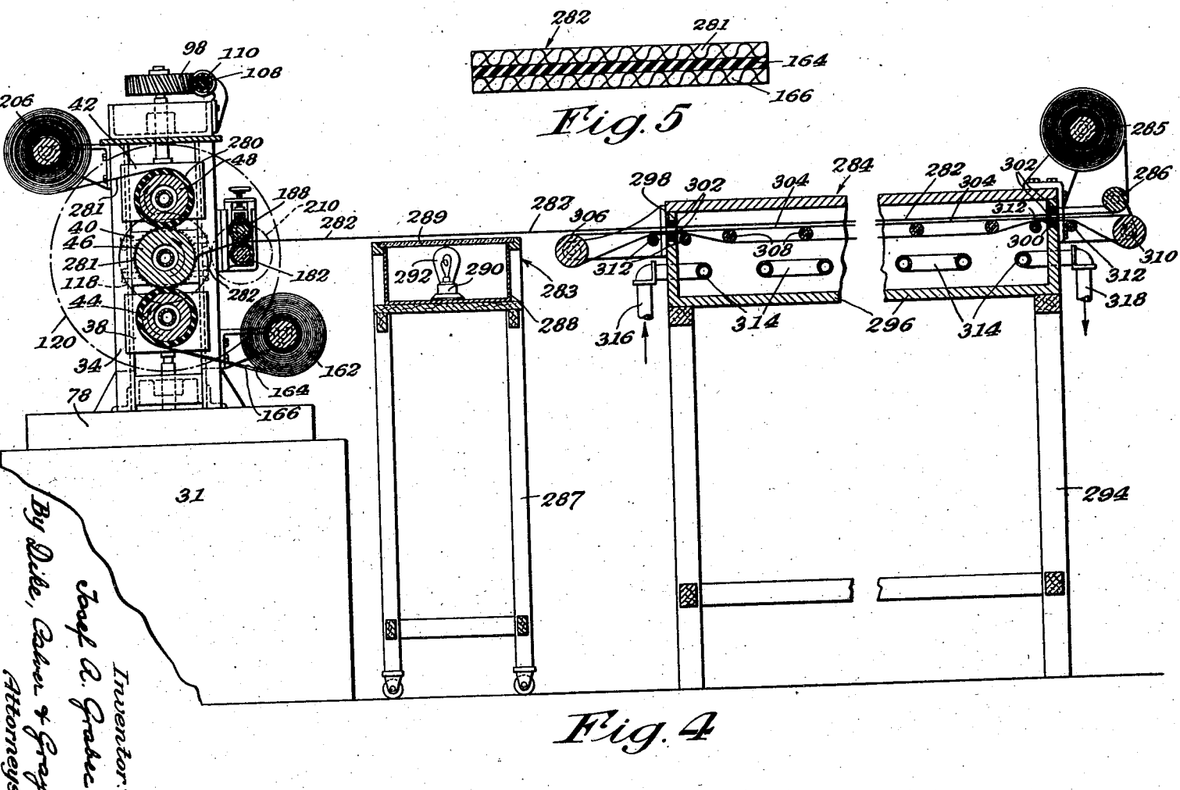
Fig. 4 is a cross-section of the machine illustrated in Figs. 1 and 2, and of other structure which may be used in conjunction with said machine.
Fig. 5 is an enlarged, fragmentary section of three supply materials which may be molded into a composite material in the present machine.

While the machine illustrated in Figs. 1, 2 and 4 shows a vertical disposition of the rolls 44, 46 and 48, it is to be understood that the same could be arranged in any other convenient manner, for instance, horizontally. Vertically disposed rolls such as shown in Figs. 1, 2 and 4 have, however, the advantages that foreign matter cannot drop between the rolls and that the operator of the machine may readily see the material pass between the various rolls and quickly observe any faults in their cooperation due to any cause whatever.

*Alternative construction of pin roll*

Figure 6:
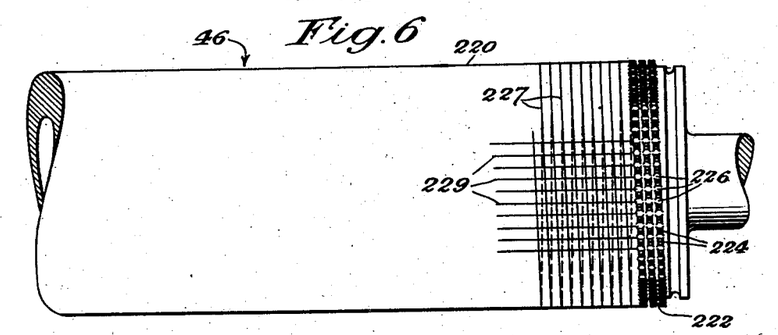
Fig. 6 is a fragmentary view of an element of the machine, to wit, a "pin" roll.
Figure 8:
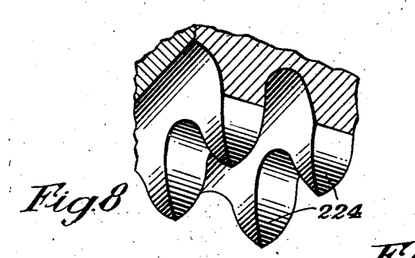
Fig. 8 is an enlarged, fragmentary perspective view, partly in section, of one form which the teeth of the "pin" roll in Fig. 6 may assume.
Figure 9:
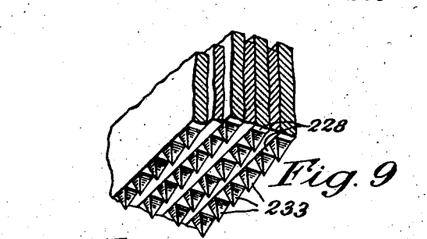
Fig. 9 is an enlarged, fragmentary perspective view, partly in section, of the modified "pin" roll in Fig. 7.
Figures 12, 13, 14, 15, 16, 17:
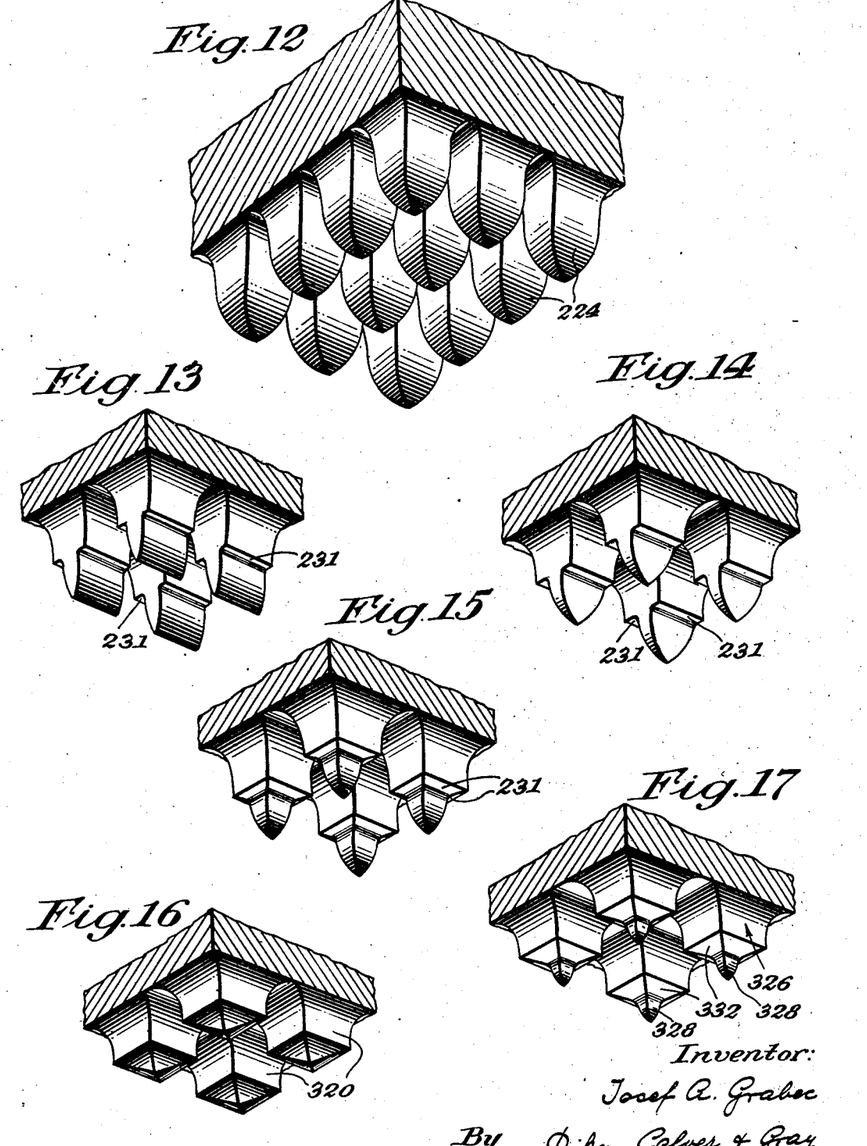
Figs. 12 to 17, inclusive, are enlarged, fragmentary perspective views, partly in section, of certain forms which the teeth of the "pin" roll may assume.

The pin roll 46 may be a steel roll 220 having the perforation-forming elements or teeth 224 machined in its periphery (Fig. 6). In this event, the steel roll 220 is preferably grooved spirally in a lathe to obtain the peripherally extending cavities 222 between the teeth 224, and is also grooved longitudinally to obtain the longitudinally extending cavities 226 between the teeth 224. The spiral and longitudinal machining of the steel blank 220 is also indicated in Fig. 6 by a few straight lines 227 and 229, respectively. Machining of the steel roll 220 as aforesaid produces orderly arranged teeth 224 which are square or at least rectangular in section along planes curved concentrically to the periphery of the roll. Subsequent operations with a file, profile cutter or any other convenient tool may serve to round the flanks of the teeth substantially as illustrated in Figs. 12 to 15, inclusive, or to provide various tapered shoulders 230 in the flanks of the teeth as illustrated in Figs. 13 to 15, inclusive. The bottoms of the peripherally and longitudinally extending tooth cavities may be rounded during the spiral and longitudinal machining of the steel roll 220, or they may be rounded subsequently to assume any desired curvature. By making the spiral and longitudinal grooves in the steel roll 220 of different depth, it is obvious that the tooth cavities peripherally and longitudinally of said roll will be of correspondingly different depth as shown in Fig. 8. The different depth of these tooth cavities causes intersecting rubber ribs to have different heights. In so machining a steel roll, it is possible to obtain a very great number of teeth per square inch of the periphery of the roll.

Figure 7:
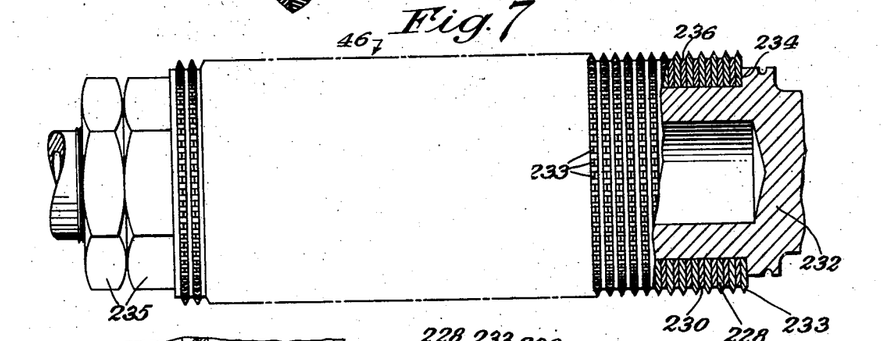
Fig. 7 is a fragmentary view, partly in section, of a modified construction of said "pin" roll.

If a considerably greater number of teeth per square inch of the periphery of the roll is desired, it is preferable to use the modified pin roll in Fig. 7. This pin roll comprises steel laminations 228, which are spaced from each other by interposed spacers 230 and stacked on a steel core 232. The core 232 is preferably provided with a shoulder 234 against which the laminations 228 and interposed spacers 230 are pressed by any suitable means such as the nuts 235, for instance.

Prior to the assembly of the laminations 228 with the spacers 230 and the steel core 232, said laminations are preferably stacked side by side and their peripheries machined to obtain teeth 233 of any of the profiles shown in Figs. 9 and 12 to 15, inclusive, if viewed in one direction, to wit, longitudinally of the stacked laminations.

It is also possible to mold intersecting rubber ribs of different height, simply by radially spacing the bottoms of the machined tooth cavities in the laminations from the periphery of the interposed spacers.

Figure 10:
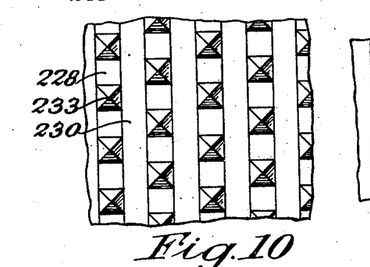
Figs. 10 and 11 are enlarged, fragmentary views of the modified "pin" roll in Fig. 7, indicating more particularly several of a great number of variations in the disposition and dimensions of the teeth of said "pin" roll.
Figure 11:
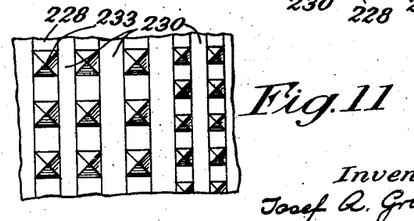

The advantages of a laminated pin roll are that the laminations may, for example, be twisted relative to each other to any desired extent so that the teeth of one peripheral row project into the cavities between the teeth of an adjacent peripheral row if viewed longitudinally of the roll as illustrated in Fig. 10. Also, certain peripheral rows of teeth may without special cost be spaced at closer intervals than other peripheral rows of teeth, or the teeth of certain rows may be made smaller than the teeth of other rows, all as indicated in Fig. 11. Consequently, the laminated pin roll has the advantage that irregular perforation patterns can be readily obtained without great cost. Also, if one or more of the perforating teeth of a laminated roll become excessively worn or even broken it is a simple matter to replace some laminations and use the same pin roll again.

It is to be understood that the alternative constructions of the pin roll are by no means limited to the described modes of machining either a blank steel roll or laminations, nor to the few illustrated possibilities of obtaining different perforation patterns with laminations, nor to the few illustrated forms of the teeth of either alternative construction of the pin roll. Obviously, shapes and profiles of the teeth other than those illustrated in the drawings may be found advantageous in certain cases.

Construction of counterroll

The counterroll 44 (Figs. 1 and 2) has a peripheral element of softer material than the material of the teeth of the pin roll and must even be somewhat elastic to assure uniform seating of said teeth on said counterroll while the machine is in operation. For reasons which will appear obvious hereafter, the counterroll must also be able to transmit heat from its steam chamber 138 to its periphery. The steel core 240 of the counterroll 44 may, therefore, be covered with rubber 241 of relatively high durometer hardness or any other suitable material such as paper, artificial resins, synthetic rubber, pressed wool or rags, or any of these materials combined with fabric or even tin or lead. The cover 241 is preferably confined between an annular shoulder 242 of the steel core 240 and a threaded or shrunk collar 244 thereon. Consequently, if the cover material becomes softened when heated, it cannot spread beyond the ends of the core 240 but may expand radially only. Since substantially accurate register of the pin roll and the counterroll is always maintained, the tips 250 of the teeth of the pin roll work into the cover 241 of the counterroll, forming small indentations 251 therein. Continuous realignment between the same teeth and the same indentations makes it imperative that the ratio between the gears 130 and 132 be an integer and that the diameters of the rolls 44, 46 be inversely proportional to the ratio of their gears 130 and 132, respectively. Also, micrometric differences in the height of the teeth of the pin roll create micrometric differences in the depth of the corresponding indentations in the counterroll so that the load transmitted by each tooth to the counterroll, is the same and uneven wear of these teeth is effectively prevented.

Figure 26:
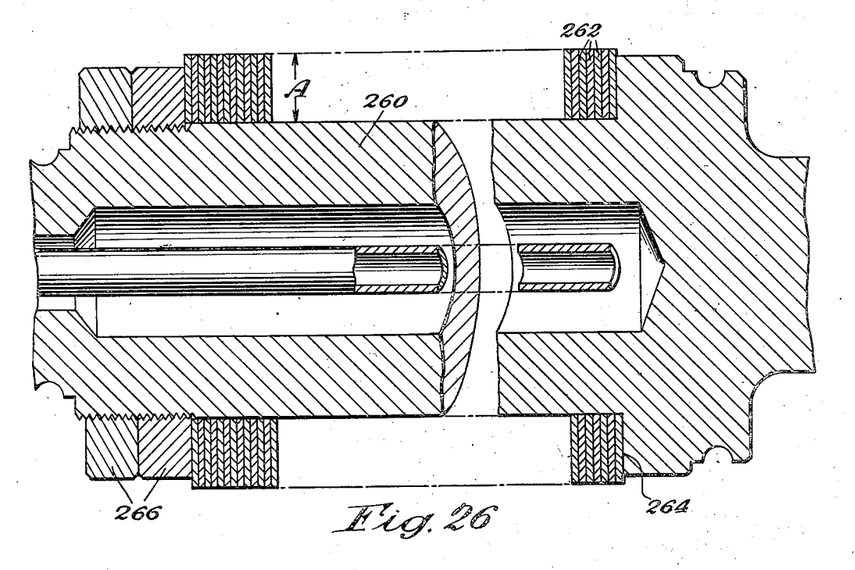
Fig. 26 is a fragmentary section through a modified construction of one of the elements of the present machine, to wit, a "counter" roll which cooperates with the "pin" roll.

The counterroll 44 may in some instances require a surface temperature of 120° C. or more. At such a temperature, a cover material of hard rubber may become softened and, although the counterroll will continue to perform satisfactorily, the hard rubber cover 241 may loosen from its steel core 240. Consequently, the counterroll shown in Fig. 26 is prefered when high temperatures are required.

This counterroll consists of a steel core 260 and paper laminations 262 which are packed against an annular shoulder 264 of said core 260 by nuts 266 or any other suitable means. Inasmuch as paper conducts heat very poorly, it is obvious that the width A (Fig. 26) of the paper laminations 262 should be kept as small as possible, yet permit a tight packing of the laminations on the core. Such a paper covered roll works well at temperature ranges above those practicable for rubber covered rolls.

Inspection device

The finished material 165 may be passed over an inspection device 283 (Fig. 4) as it leaves the machine. This inspection device may comprise any suitable frame 287 on which is mounted a box-like structure 288, having at its top a transparent plate 289, such as glass, and housing a light socket 290 with suitable electrical connections and a lamp 292 in said socket for illuminating the composite material 282 from below as it passes over said inspection device. An operator may thus discern the quality of the perforations in the rubber stock of the finished material. The use of this inspection device is naturally a matter of choice.

Vulcanizing box

The finished material may also be passed through a vulcanizing box 284 (Fig. 4) as it leaves the machine, and thereafter guided to a wind-up roll 285 over a guide roll 286. The vulcanizing box 284 may comprise any suitable frame 294 which carries a box-like structure 296, having horizontally aligned inlet and outlet openings 298 and 300, respectively, through which the finished material passes. These openings may be lined with pieces 302 of mohair between which the finished material may pass without becoming damaged.

While passing through the vulcanizing box, the composite material rests on an endless conveyor or belt 304 which passes over suitably mounted guide rolls 306, 308 and 310 and over combined guide and tensioning rolls 312. One of the guide rolls, either 306 or 310, is driven in any suitable manner (not shown), however, preferably so that the endless conveyor moves at the same rate at which the finished material leaves the machine and is wound on the roll 295. The wind-up roll 295 may be driven in any suitable manner (not shown).

Any suitable heating means may be provided in the box-like structure 296. In the present instance, there is shown a steam coil 314, having an inlet 316 and an outlet 318. Steam from any suitable source (not shown) may be admitted to said steam coil 314, preferably under the control of a manually operable valve (not shown).

Mode of operation of machine

Before starting the operation of the machine, it is well to admit steam to the rolls 44 and 46 until the same have predetermined surface temperatures. Thereafter, the surface temperatures of the rolls are kept constant by regulating the steam admission. Next, the machine is started whereupon the counterroll 44 being preferably slightly withdrawn from the pin roll when the machine is at rest, is brought into re-engagement with the pin roll 46, while material from the supply roll 162 is at the same time held between the bite of both rolls 44 and 46. This supply material consists in the present case of the superposed layers 164 and 166 of rubber and distensible textile fabric, respectively, and is so fed between the rolls 44, 46 that the rubber layer 164 is next to the pin roll. As best shown in Fig. 1, the material 164, 166 passes from the supply roll 162 to the counterroll 44, then partly around the periphery of the latter until it meets the pin roll 46 on which it remains for some time, and is finally drawn from said pin roll by the pull-off rolls 182, 188.

The supply material 164, 166 is heated by the counterroll 44 to such an extent that the rubber ply 164 is plasticized when said supply material reaches the bite of the rolls 44, 46 wherein the plastic rubber becomes molded and thereby also firmly bound to the fabric layer 166 in a manner to be described in detail hereafter. The material, which is now in composite form, is then either cooled or further heated by the pin roll 46 while traveling with the same. Since it requires some force to withdraw the composite material from its engagement with the pins of the roll, the lower pull-off roll 182 (Fig. 1) is driven at a greater peripheral speed than the pin roll 46. The pull distends the material slightly and frees it from the pins. By urging pull-off roll 188 against the lower roll 182 under the variable compression of the springs 190, the operator may easily regulate the pull on the composite material 165 which is exerted by the rolls 182, 188. In this way the composite material may be drawn from the pin roll 46 within a safe angular range.

Heating of rolls

The surface temperatures of the rolls 44 and 46 are regulated in two principal ways, depending on whether the rubber contents of the composite material 165 is to be vulcanized on the pin roll 46 or whether the same is to be vulcanized later, for instance in the vulcanizing box 284 (Fig. 4).

Figure 29:
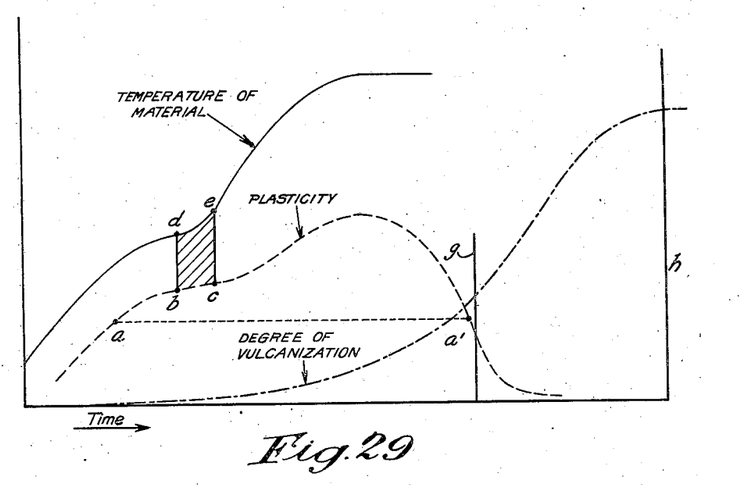
Figs. 29 and 30 are charts which graphically illustrate two examples of temperature and plasticity conditions of the rubber stock of the material prevailing shortly before, during and immediately after the molding process. These charts show also the degree of vulcanization of the rubber stock in relation to its temperature and plasticity conditions.

Fig. 29 shows several curves which represent the temperature, plasticity and vulcanization degree of the rubber stock of the material when the same is to be vulcanized on the pin roll. The counterroll 44 heats the rubber stock above the critical plasticity until its temperature reaches d. The rubber stock is in contact with both rolls 44, 46 between the points d, e and b, c of the temperature and plasticity curves, respectively. Here, the flowing and molding of the rubber takes place. The rubber stock is finally heated by the pin roll which has a much higher surface temperature than the counterroll as is evident from the course of the temperature curve in Fig. 29. The term "critical plasticity" as used herein and in the appended claims denotes that point in the plasticity curve at which the rubber stock can be removed from the pin roll without incurring plastic deformation. Removal of the composite material may, therefore, take place anywhere between the lines g and h since the plasticity of the rubber stock is now below the critical plasticity a'. Complete vulcanization of the rubber stock on the pin roll is unnecessary. The remaining degree of cure (g to h) may be given the stock in the vulcanizing box 284 (Fig. 4).

Figure 30:
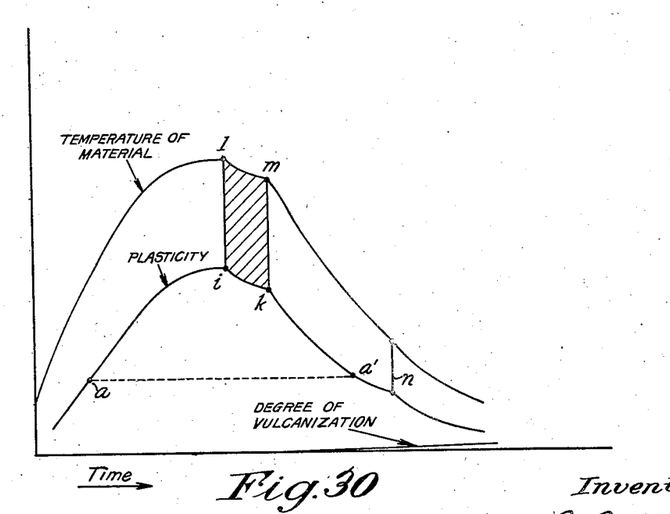

Fig. 30 shows curves similar to those of Fig. 29. These, however, illustrate the condition where the stock is vulcanized outside of the machine. The counterroll again heats the rubber stock well above the critical plasticity until its temperature reaches l. The rubber stock is then in contact with rolls 44 and 46 between the points l, m and i, k of the temperature and plasticity curves, respectively, and the molding process takes place then. The rubber stock is finally cooled by the pin roll which has a considerably lower surface temperature than the counter roll as is evidenced from the course of the temperature curve in Fig. 30. Removal of the composite material may then take place at the line n immediately after the plasticity of the rubber stock is below the critical plasticity a'. No appreciable vulcanization of the rubber stock has as yet taken place, and the same is subsequently vulcanized in the box 284 (Fig. 4), for instance.

In order to expedite the cooling of the rubber stock and thereby quickly lower its plasticity below critical so as to expedite the removal of unvulcanized composite material from the pin roll, a cooling medium is introduced into its chamber 140 instead of steam.

If it is desired to cover the rubber material on both sides with fabric, a sheet 281 of fabric from the supply roll 206 is also fed into the machine in the manner illustrated in Fig. 4. The uppermost roll 40 is then lowered and forced into engagement with the pin roll 46 to such an extent that the soft cover 260 of the roll 40 forces the fabric 281 against the bottoms of the tooth cavities in the pin roll. Some steam may be admitted to the roll 40 to cause evaporation of any moisture in the fabric 281 before the same reaches the pin roll. The fabric sheet 281 then meets the superposed layers 164 and 166 of the supply material 162 at the bite or "nip" of the rolls 44 and 46, and some of the plasticized rubber will also be forced into the meshes of the second fabric layer 281 when the molding operation takes place. The composite material 282 is withdrawn from the pin roll 46 by the pull-off rolls 182, 188. This composite material 282 may be vulcanized on the pin roll or in the vulcanizing box 284 (Fig. 4).

Cooperating dies

Figure 27:
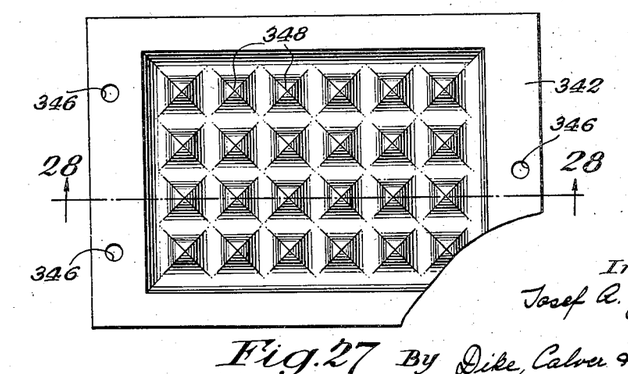
Fig. 27 is a fragmentary plan view of one element of a modified form of mold for producing the same material as in the machine disclosed in Figs. 1 and 2.
Figure 28:
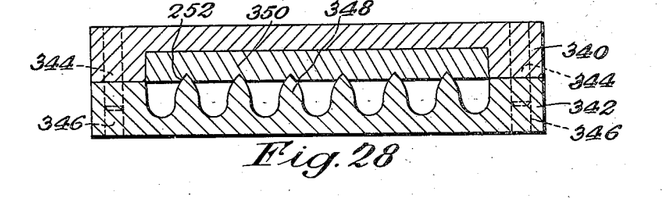
Fig. 28 is a section taken substantially along the line 28—28 of Fig. 27, showing also the other element of said modified mold in section.

Instead of using the described rolls for a continuous process of forming composite material, the cooperating dies 340 and 342 (Figs. 27 and 28) may be used for smaller articles of a composite material which do not justify the higher cost of rolls. More particularly, the dies 340 and 342 are provided with dowel pins 344 and registering holes 346. Provided in the bottom die 342 by any suitable method are a number of perforating teeth 348 which may be of any suitable shape. The top die 340 is provided with a lining 350 which may be of the same material as the cover material 241 of the counterroll 44 and be indented at 242 by the teeth 348 of the die 342.

A sheet of rubber with or without a superposed layer of fabric is placed in the dies, whereupon the latter are closed under pressure and heat is applied to the sheets through the dies. A molding process takes place then which is the same as that in the rotary rolls. Vulcanization of the molded material can be completed in the dies by the application of heat for a suitable period, or the die can be cooled after the molding process is completed and the material removed therefrom for vulcanization elsewhere.

Molding process

Figures 18, 19, 20, 21, 22, 23, 24, 25:
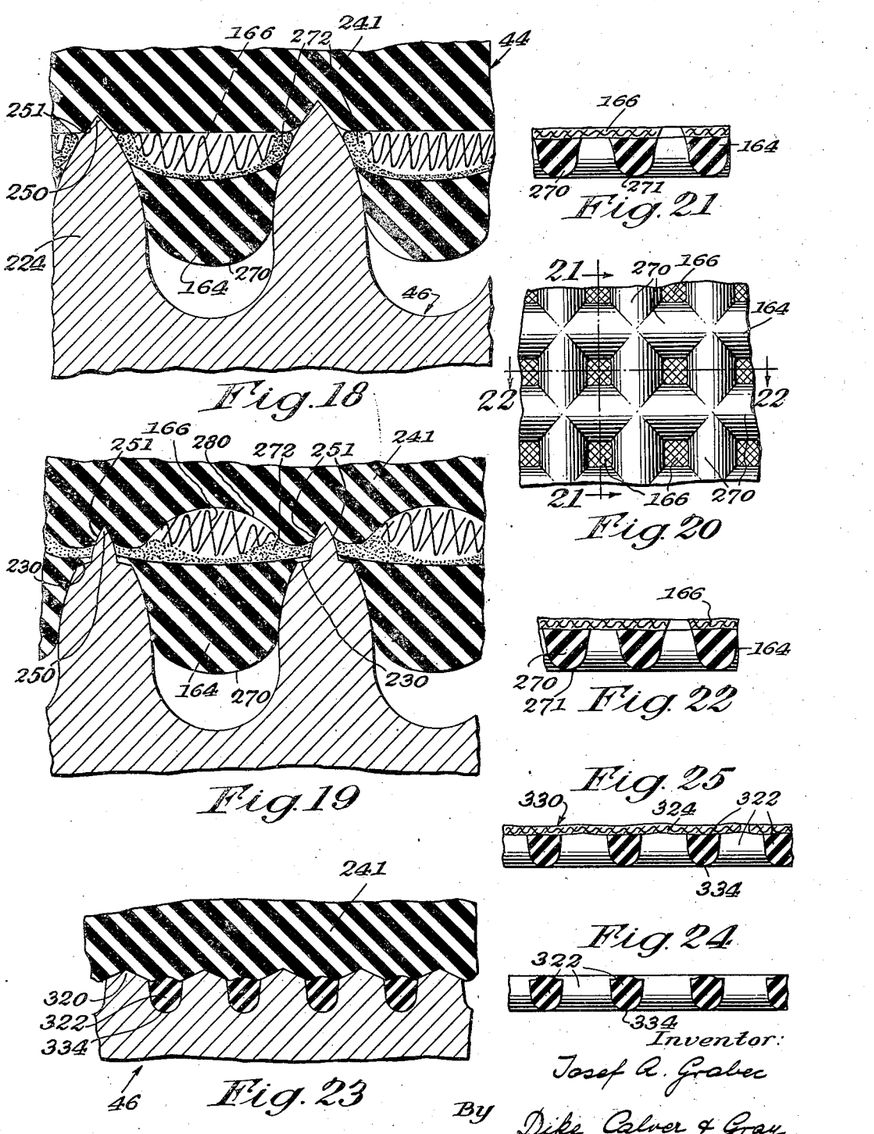
Figs. 18 and 19 are greatly enlarged, fragmentary sections of the cooperating molding structure of the machine which includes the "pin" roll. More particularly, these figures disclose different shapes of the teeth of the "pin" roll.
Fig. 20 is an enlarged, fragmentary plan view of one form of composite material that may be produced in the present machine.
Figs. 21 and 22 are fragmentary sections on the lines 21—21 and 22—22, respectively, of Fig. 20.
Fig. 23 is a greatly enlarged, fragmentary section of cooperating structure of the machine for molding only elastic material without any backing material such as fabric.
Fig. 24 is an enlarged, fragmentary section through material produced by the cooperating structure shown in Fig. 23.
Fig. 25 is an enlarged, fragmentary section through the same material as shown in Fig. 25 which is, however, backed with fabric.

Figs. 18 and 19 illustrate the molding process which the rubber of the supply material undergoes either in the rolls 44, 46 or in the dies 340, 342. It will be observed in the above figures that the highly plastic rubber 164 is forced against the fabric 166 by the flanks of the perforation-molding teeth, resulting in the formation of the intersecting rubber ribs 270 (Figs. 20 to 22). No threads are ever severed or broken, for the plastic rubber grips each thread and as it is being displaced by an intrusive molding tooth, each thread is carried away from the point itself. In addition, the wedging effect of the flanks of the adjacent molding teeth causes the rubber not only to flow into and to assume the shape of the cavities between the adjacent teeth, but also the rubber is flowed into the meshes of the fabric to an extent illustrated by the stippled areas 272 in Figs. 18 and 19. Thus the rubber is molded about many threads and is securely bonded to the fabric.

By using the shouldered teeth shown in Figs. 19 and 13 to 15, inclusive, more rubber will be forced into the meshes of the fabric.

If it is desired to give the composite material a pleasing ribbed appearance on its fabric side, the surface portions 280 between adjacent indentations 251 may be rounded (Fig. 19). If a rubber sheet alone is molded, these rounded surface portions 280 will round the adjacent portions of the rubber ribs (Figs. 23 and 24).

Material thus molded may have the texture that is illustrated greatly enlarged in Fig. 20. Figs. 21 and 22 are greatly enlarged sectional views of the perforated material shown in Fig. 20. Now and then a few perforations are continued through the fabric wherever a perforating tooth has spread the meshes of the fabric apart. This is also shown in Figs. 21 and 22.

The teeth 320, shown in perspective in Figs. 16 and 23, are particularly suited for forming very thin sheet rubber without fabric into a perforated material such as illustrated in Fig. 24. This material comprises very fine, intersecting ribs 322.

If it is desired to apply a backing material 324 of any kind of fabric to the perforated rubber sheet in Fig. 24, the teeth 326, shown in Fig. 17, may be used. These teeth 326 may differ from the teeth 320 only by having tips 328 which will pass into the fabric 324 on molding the composite material 330 (Fig. 25). The tapered shoulders 332 of the teeth 326 will force some of the rubber into the meshes of the fabric and thus establish a lasting bond between both materials.

Distensibility of composite material

Knit fabrics have little extensibility in the direction in which the goods are knitted, but possess extensibility in a direction at right angles thereto. However, corsets, girdles and similar articles require a material which is distensible in any direction. By stretching knit fabrics in the direction of their greatest extensibility and then permanently combining rubber therewith while the fabric is in a stretched condition, the composite material which results is distensible in any direction. This discovery is used to good advantage in the manufacture of the new composite material.

Thus, the fabric material is held stretched in the direction of its greatest extensibility during the molding process. A continuous supply of textile fabric, which can be stretched lengthwise as it is fed into the machine, is obtained by severing knit textile fabrics across their width, i. e., in the direction of their greatest extensibility and then sewing together the severed fabric pieces with their non-severed sides in end to end relation.

Rubber material

In order to obtain a good product of composite materials or of rubber alone, the rubber must be tough and must have considerable distensibility and resistance against tearing. A high grade product is, for instance, obtained by using the following rubber compound for the rubber ply: 80% pale crepe rubber, 16% zinc oxide, 1% accelerator, 2% sulphur and 1% color. A product of somewhat poorer quality may be made, for instance, with the following rubber compound: 50% crepe rubber, 5% zinc oxide, ¼% stearic acid, 1% color, 40% whiting, 1% accelerator, 1% sulphur and 1¾% softener. These are, of course, only examples of rubber compounds which can be used, and it is to be distinctly understood that any other rubber compounds may be used.

The terms "elastic material," "rubber" or "rubber-like substance," as used herein and in the appended claims, are meant to include any material or composition of matter having the property of elasticity and being capable of conversion from a deformable into a more or less permanently elastic state.

Characteristics of new materials

The textile fabric is firmly attached to a coherent system of molded ribs 270 of suitable breadth and height which are of elastic material, such as rubber. The height and cross-section of the ribs is determined by the desired resistance of the finished or perforated material to distension. Also, if the resistance to distension in two transverse directions is to be different, the intersecting ribs of elastic material will be made of different height or of different cross-section, or both.

While a finished material of any desired perforation pattern may be produced, it is preferable to produce a finished material in which the uncovered area of the textile fabric used is as large as possible, and should preferably amount in all to at least 50% of the entire area of the fabric in order that the composite material may permit transpiration. The elastic ribs of the finished material are on the other hand preferably spaced as closely as possible since thick, widely spaced webs not only detract from the ventilating properties of the composite or finished material, but also reduce its suitability for holding stitches when sewn.

If the composite material is used for wear on the human body with the rubber side turned toward the skin, the contact area between the skin and the composite material is very small, due to the rounded peaks 271 (Figs. 21 and 22) of the rubber ribs 270 as can be readily understood. Consequently, very few pores will be covered by rubber, and the greater area of the skin will be well ventilated so that the wearer will experience a welcome cooling effect wherever the material is worn if air has free access to said material.

The elimination of any excess rubber in the composite material by the molding of a comparatively thin ply of rubber into intersecting ribs with intervening rectangular or square perforations not only represents a saving in rubber stock, but results also in a composite material of light weight which has great elasticity in the directions of the intersecting rubber ribs.

I claim:

1. The method of producing perforated sheet rubber, which includes placing a sheet of uncured rubber on a heated backing surface to heat-plasticize the rubber forcing simultaneously a multiplicity of heated molding cores through the rubber sheet and against said backing surface substantially when the rubber has become heat-plasticized, and maintaining the molded rubber in contact at least with the heated cores until at least such a degree of vulcanization has taken place that the rubber permanently retains its molded shape.

2. The method of producing foraminous composite material, which includes superposing a sheet of uncured rubber upon a sheet of textile fabric, placing the superposed sheets on a heated backing surface with the fabric lying on said surface to heat-plasticize the rubber, forcing simultaneously a multiplicity of heated molding cores through the rubber sheet and against said surface substantially when the rubber has become heat-plasticized, and maintaining the rubber and fabric in contact at least with the heated cores until at least such a degree of vulcanization has taken place that the rubber permanently retains its molded shape.

JOSEF A. GRABEC.